Jan. 17, 1939.  W. SCHOLZ  2,144,275
FARM CULTIVATOR
Filed Dec. 20, 1937  3 Sheets-Sheet 1
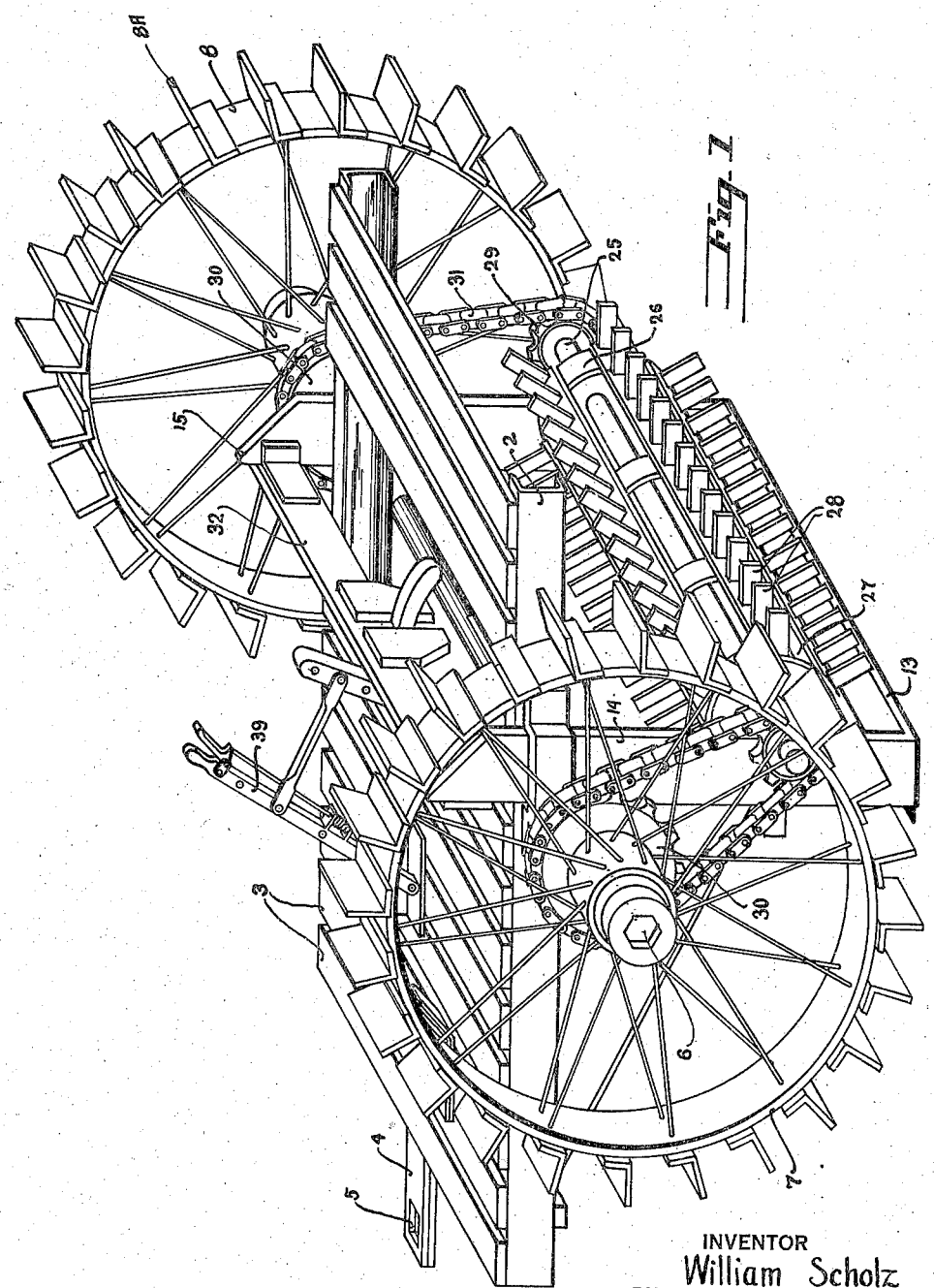
INVENTOR
William Scholz
BY
ATTORNEY Jan. 17, 1939.   W. SCHOLZ   2,144,275
FARM CULTIVATOR
Filed Dec. 20, 1937   3 Sheets-Sheet 2
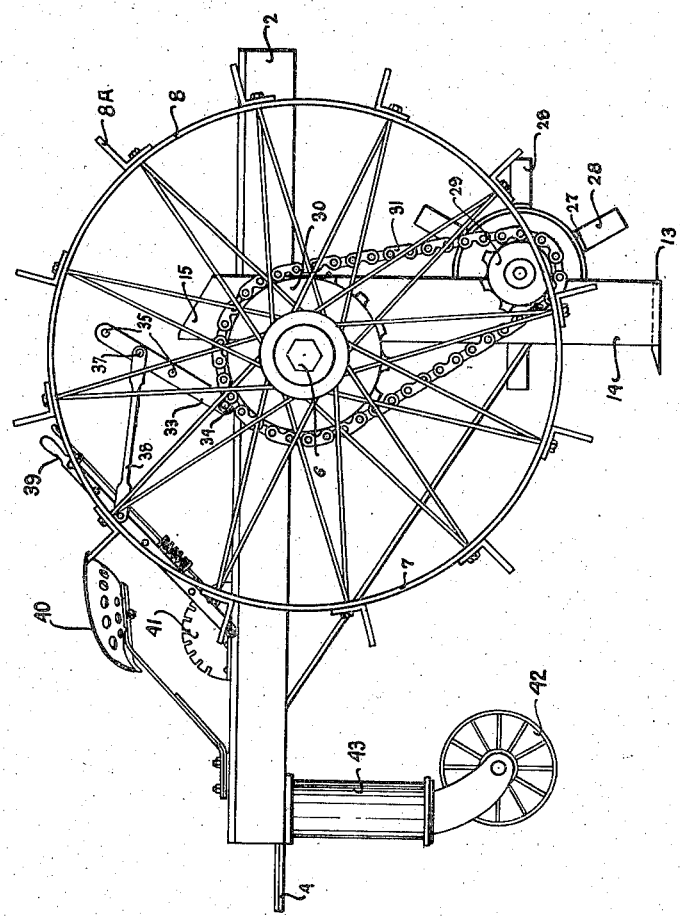
Fig. II
INVENTOR
William Scholz
BY
ATTORNEY Jan. 17, 1939.  W. SCHOLZ  2,144,275
FARM CULTIVATOR
Filed Dec. 20, 1937   3 Sheets-Sheet 3
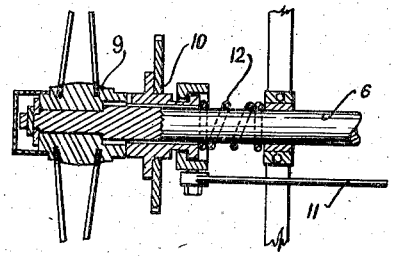
Fig. III
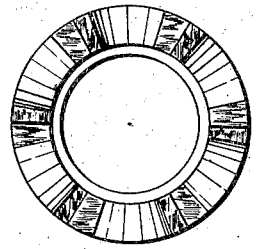
Fig. IV
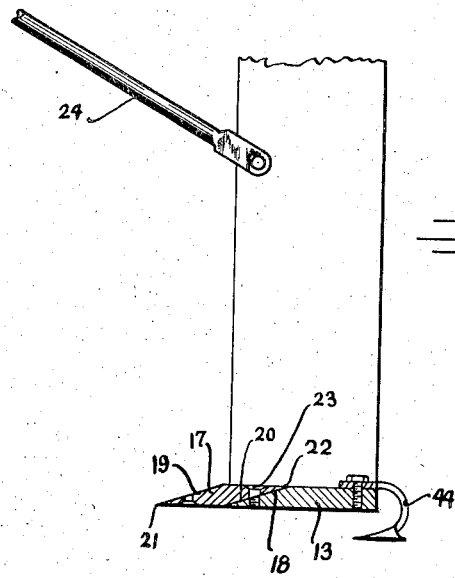
Fig. VI
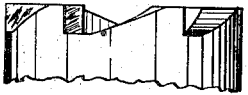
Fig. V
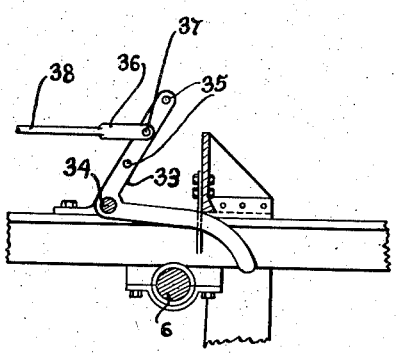
Fig. VII
Inventor
William Scholz
By
Attorney Patented Jan. 17, 1939

2,144,275

UNITED STATES PATENT OFFICE 2,144,275

FARM CULTIVATOR

William Scholz, Scappoose, Oreg.

Application December 20, 1937, Serial No. 180,738

2 Claims. (Cl. 97—40)

The invention may be used for the pulverizing of soil, as a weeder and as a sub-soiler.

The invention is comprised primarily of a frame that is supported by traction wheels. The frame has a draw-bar attachment disposed upon its front end to facilitate the same being drawn by a tractor, or by animal draft. A U-shaped shoe support is adjustable relative to the frame and an adjustable cutter blade is carried by the shoe support. A pulverizer head is suspended from the frame and means is provided for rotating the frame through the rotation of the traction wheels. Manual manipulation is provided for raising and lowering the cutter shoe to desired placement and sub-soil cultivator plows are provided that are securable to the cutter shoe. The device may be used simultaneously as a weeder and as a pulverizer. It may be utilized as a pulverizer and as a sub-soiler.

The primary purpose and object of my invention consists in providing a simply constructed device for use as a farming tool that is adapted for being drawn by traction or animal draft and that may be used as a weeder, sub-soiler for pulverizing the top surface of the soil to make a seed bed of the same to retain the moisture content of the soil being tilled.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a perspective rear end view of the assembled device.

Fig. 2 is a side view of the assembled device.

Fig. 3 is a fragmentary sectional end view of the hub of one of the traction wheels.

Fig. 4 is an end view of one of the jaw clutches.

Fig. 5 is a fragmentary plan view of the jaw clutch illustrated in Fig. 4.

Fig. 6 is a sectional end view of the cutter shoe and of the support therefor.

Fig. 7 is a fragmentary side view of the bell crank and the lever assembly for raising and lowering the cutter shoe.

Like reference characters refer to like parts throughout the several views.

My device is primarily comprised of a structural fabricated frame made primarily of channel side frame members 1 and 2 that have a cross platform 3 disposed thereupon and that secures the channel frame together. A draw bar 4 is secured to the frame and to which a tractor or other force may be attached. A suitable eye 5 is disposed in the draw bar to facilitate attachment thereto. A shaft 6 acts as a support for the frame assembly and traction wheels 7 and 8 are secured to the oppositely disposed ends of the shaft. Each of the traction wheels has a central hub 9 and the hub 9 normally rotates upon the outer end of the shaft 6. A movable clutch 10 is disposed upon the shaft 6 and is splined or otherwise secured thereto to prevent the rotation of the clutch upon the shaft. The clutch 10 may be moved longitudinally of the shaft by a clutch rod 11 and the jaw faces are disposed upon the inner end of each of the hubs 9 and upon the outer end of each of the clutches 10 and a coil spring 12 maintains the two clutch faces in normal engagement with each other.

A U-shaped shoe support 13 has legs 14 and 15 that upwardly extend from the oppositely disposed ends of the shoe support. These legs move within suitable guideways formed integral with the frame and locking means as set screws secure the legs in placed position relative to the guide and position the bottom of the shoe to the desired depth that the same is to move within the soil that is to be cultivated.

A cutter blade 17 is securable to the front of the base 13. An inclined surface 18 forms a front top surface of the base 13 and the cutter blade has inclined surfaces 19 and 20 that precisely fit and engage the sloping surface 18 of the base. The surfaces 19 and 20 are parallel surfaces and cutting edges 21 and 22 are formed at the opposite edges so that when the blade is dulled on one of its edges it may be reversed and placed so that the opposite one of the cutting edges may be used. At each conditioning of the cutting blade two cutting edges may be sharpened. Holes are provided in the cutting blade and the same is secured to the base 13 by counter-sunk screws 23. A pair of tension bolts 24 secure the respective legs 14 and 15 to the frame.

A shaft 25 is secured to the respective legs 14 and 15 and is journaled relative thereto by any suitable bearings. A plurality of cylindrical bands 26 are secured to the shaft 25 and bars 27 are spaced about the periphery of the bands 26 and secured thereto. Breaker teeth 28 are secured to the respective bars 27.

One or more sprockets 29 are secured to the shaft 25 and a like number of sprockets 30 are secured to the shaft 6 and driving chains 31 are trained about the respective sprockets and impart rotation to the pulverizer head mounted upon the shaft 25.

A cross bar 32 is secured to the respective legs 14 and 15 and a bell crank 33 is journaled about a supporting pin 34. One end of the bell crank 33 passes beneath the cross bar 32 and upon which the cross bar rests. The oppositely disposed arm of the bell crank has a plurality of spaced arms 35 disposed therein and a bifurcated head 36 engages the arm in which the spaced holes 35 are disposed and are securable thereto by a pin 37. A rod 38 connects the head with a lever 39 and a manipulation of the lever positions the cutter blade assembly in desired placement.

A seat 40 is disposed upon the frame and in suitable relationship with the lever 39 to facilitate the manual manipulation of the same.

A quadrant 41 is provided and a suitable latch is carried by the lever 39 to lock the lever 39 in desired placement. A pilot wheel 42 is provided at the front end of the frame and the pilot wheel 42 is journaled relative to the frame by any suitable journal bearings 43.

If it is desired to cultivate or break up the sub-soil below the surface over which the base 32 and the cutter blade 17 associated therewith operate, a plurality of cultivating plows 44 may be secured to the base 13. These sub-soil plows 44 are illustrated in Fig. 6. The sub-soil plows may be made to operate at the desired depth to meet the requirements of sub-soiling.

Cleats 8A are secured to the outer periphery of the traction wheels and are disposed in spaced relation thereupon and the same may be secured to the traction wheels by any suitable fastening means.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

I claim:

1. In a device of the class described, the combination of a fabricated frame, a draw bar disposed at the front end of the platform and a pilot wheel for supporting the front end of the platform, a pair of driving wheels for supporting the platform, a hub disposed within the wheel and means for effecting driving relationship between the shaft upon which the wheel is mounted and the wheel, a U-shaped shoe support, means for adjusting the U-shaped support vertically, a rotary breaker head disposed at the rear of the U-shaped support, and means for imparting rotation from the driving wheel to the breaker head, the front end of the base of the U-shaped support being beveled and a cover blade beveled at its top and bottom sides to render the same reversible with the respective front and rear edges of the cutter blade being sharpened, and means for removably securing the cutter blade to the base of the shoe support.

2. In a device of the class described, the combination of a wheel supported fabricated frame, a U-shaped shoe support adjustably securable to the frame, a pair of tension bolts connecting the vertical members of the U-shaped shoe support with the frame with the front edge of the base of the U-shaped shoe support being beveled, a cutter blade securable to the base of the U-shaped shoe support, said cutter blade being sharpened at its opposite edges to adapt the same for being secured to the U-shaped shoe support so that either edge may be made the cutting edge, a plurality of cultivator plows removably securable to the base of the U-shaped shoe support and a breaker head mounted relative to the legs of the U-shaped shoe support and means for rotating the same.

WILLIAM SCHOLZ.